US012561956B2

(12) United States Patent
 Kulal et al.

(10) Patent No.: US 12,561,956 B2
(45) Date of Patent: Feb. 24, 2026

(54) AFFORDANCE-BASED REPOSING OF AN OBJECT IN A SCENE

(71) Applicant: ADOBE INC., San Jose, CA (US)

(72) Inventors: Sumith Kulal, Palo Alto, CA (US);
 Krishna Kumar Singh, San Jose, CA
 (US); Jimei Yang, Mountain View, CA
 (US); Jingwan Lu, Sunnyvale, CA
 (US); Alexei Efros, Berkeley, CA (US)

(73) Assignee: ADOBE INC., San Jose, CA (US)

( * ) Notice: Subject to any disclaimer, the term of this
 patent is extended or adjusted under 35
 U.S.C. 154(b) by 490 days.

(21) Appl. No.: 18/058,528

(22) Filed: Nov. 23, 2022

(65) Prior Publication Data

US 2024/0169701 A1 May 23, 2024

(51) Int. Cl.
 G06V 10/774 (2022.01)
 G06T 5/50 (2006.01)
 G06T 7/194 (2017.01)
 G06T 7/70 (2017.01)

(52) U.S. Cl.
 CPC ............. G06V 10/774 (2022.01); G06T 5/50
 (2013.01); G06T 7/194 (2017.01); G06T 7/70
 (2017.01); *G06T 2207/20221* (2013.01)

(58) Field of Classification Search
 CPC ........ G06V 10/774; G06V 10/82; G06T 5/50;
 G06T 7/194; G06T 7/70; G06T
 2207/20221
 See application file for complete search history.

(56) References Cited

U.S. PATENT DOCUMENTS

| | | | |
|---|---|---|---|
| 2022/0130499 A1* | 4/2022 | Zhou ...................... | G06V 10/25 |
| 2022/0270357 A1* | 8/2022 | Goyal ..................... | G06T 7/194 |
| 2024/0135611 A1* | 4/2024 | Costin .................... | G06T 11/60 |
| 2025/0022099 A1* | 1/2025 | Song ........................ | G06T 5/50 |
| 2025/0104349 A1* | 3/2025 | Bi ........................... | G06T 15/20 |

FOREIGN PATENT DOCUMENTS

| | | | | |
|---|---|---|---|---|
| SE | 2251301 A1 | * | 11/2022 | ............. G06V 40/20 |

OTHER PUBLICATIONS

Useinov, Leon, Valeria Efimova, and Sergey Muravyov. "Image
Augmentation for Object Detection and Segmentation with Diffu-
sion Models." Proceedings Copyright 812 (2020): 820. (Year:
2020).*
Li, Yuheng, et al. "Mixnmatch: Multifactor disentanglement and
encoding for conditional image generation." Proceedings of the
IEEE/CVF conference on computer vision and pattern recognition.
2020. (Year: 2020).*

(Continued)

*Primary Examiner* — Emily C Terrell
(74) *Attorney, Agent, or Firm* — F. CHAU &
ASSOCIATES, LLC

(57) ABSTRACT

Systems and methods for inserting an object into a back-
ground are described. Examples of the systems and methods
include obtaining a background image including a region for
inserting the object, and encoding the background image to
obtain an encoded background. A modified image is then
generated based on the encoded background using a diffu-
sion model. The modified image depicts the object within
the region.

15 Claims, 14 Drawing Sheets

(56)    References Cited

OTHER PUBLICATIONS

Avrahami, Omri, Dani Lischinski, and Ohad Fried. "Blended diffusion for text-driven editing of natural images." Proceedings of the IEEE/CVF conference on computer vision and pattern recognition. 2022. (Year: 2022).*

Rombach, Robin, et al. "High-resolution image synthesis with latent diffusion models." Proceedings of the IEEE/CVF conference on computer vision and pattern recognition. 2022. (Year: 2022).*

Robin Rombach, Andreas Blattmann, Dominik Lorenz, Patrick Esser, and Björn Ommer. High-resolution image synthesis with latent diffusion models. In Proceedings of the IEEE/CVF Conference on Computer Vision and Pattern Recognition, pp. 10684-10695, 2022.

Aditya Ramesh, Prafulla Dhariwal, Alex Nichol, Casey Chu, and Mark Chen. Hierarchical text-conditional image generation with clip latents. arXiv preprint arXiv:2204.06125, 2022.

Xiaolong Wang, Rohit Girdhar, and Abhinav Gupta. Binge watching: Scaling affordance learning from sitcoms. In CVPR, 2017.

Jonathan Ho, Ajay Jain, and Pieter Abbeel. Denoising diffusion probabilistic models. Advances in Neural Information Processing Systems, 33:6840-6851, 2020.

Badour Albahar, Jingwan Lu, Jimei Yang, Zhixin Shu, Eli Shechtman, and Jia-Bin Huang. Pose with style: Detail-preserving pose-guided image synthesis with conditional stylegan. ACM Transactions on Graphics (TOG), 40(6):1-11, 2021.

Liqian Ma, Xu Jia, Qianru Sun, Bernt Schiele, Tinne Tuytelaars, and Luc Van Gool. Pose guided person image generation. In Advances in Neural Information Processing Systems, pp. 405-415, 2017.

* cited by examiner

Figure 5B:
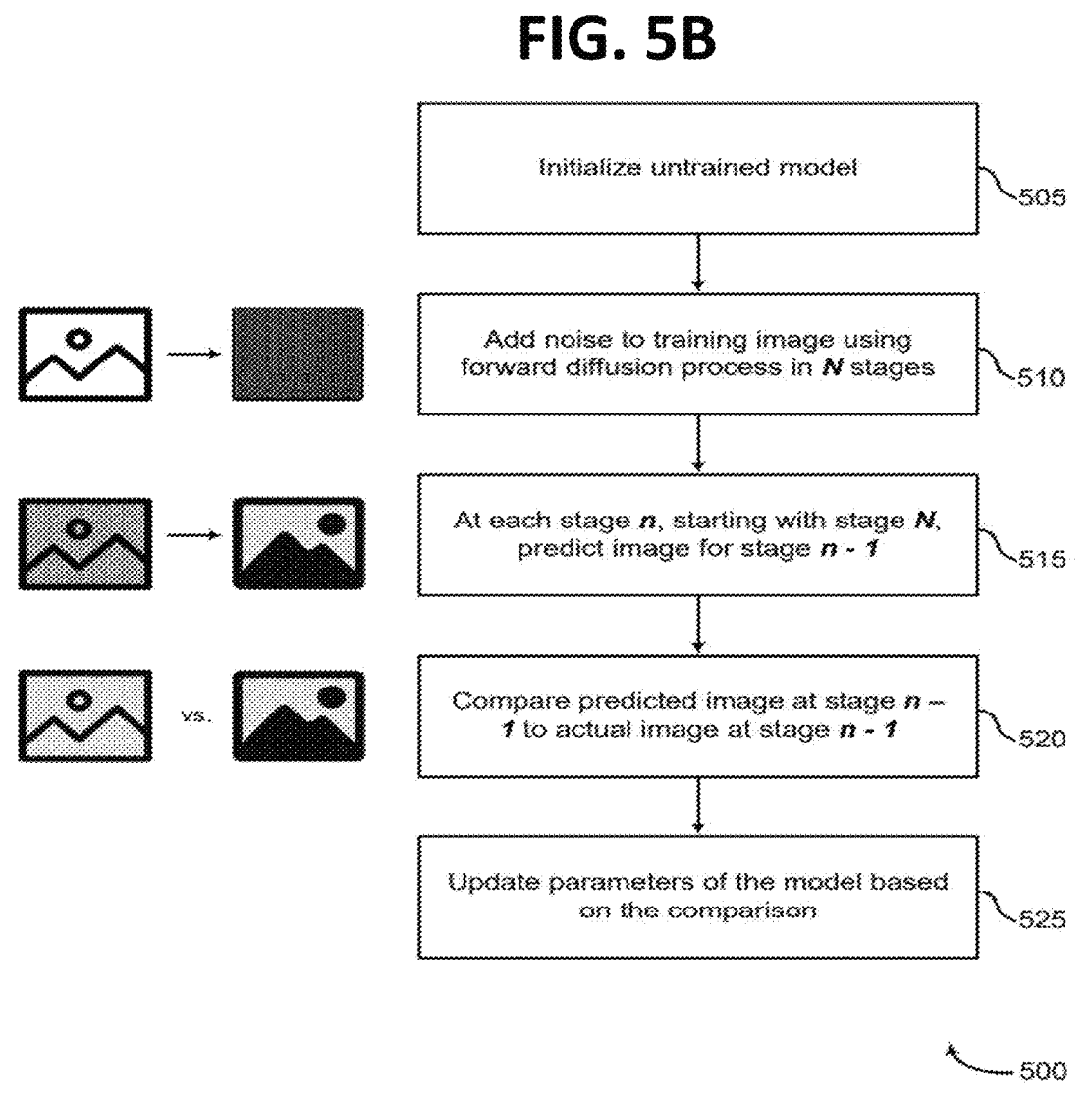

Initialize untrained model — 505

Add noise to training image using forward diffusion process in $N$ stages — 510

At each stage $n$, starting with stage $N$, predict image for stage $n - 1$ — 515

Compare predicted image at stage $n - 1$ to actual image at stage $n - 1$ — 520

Update parameters of the model based on the comparison — 525

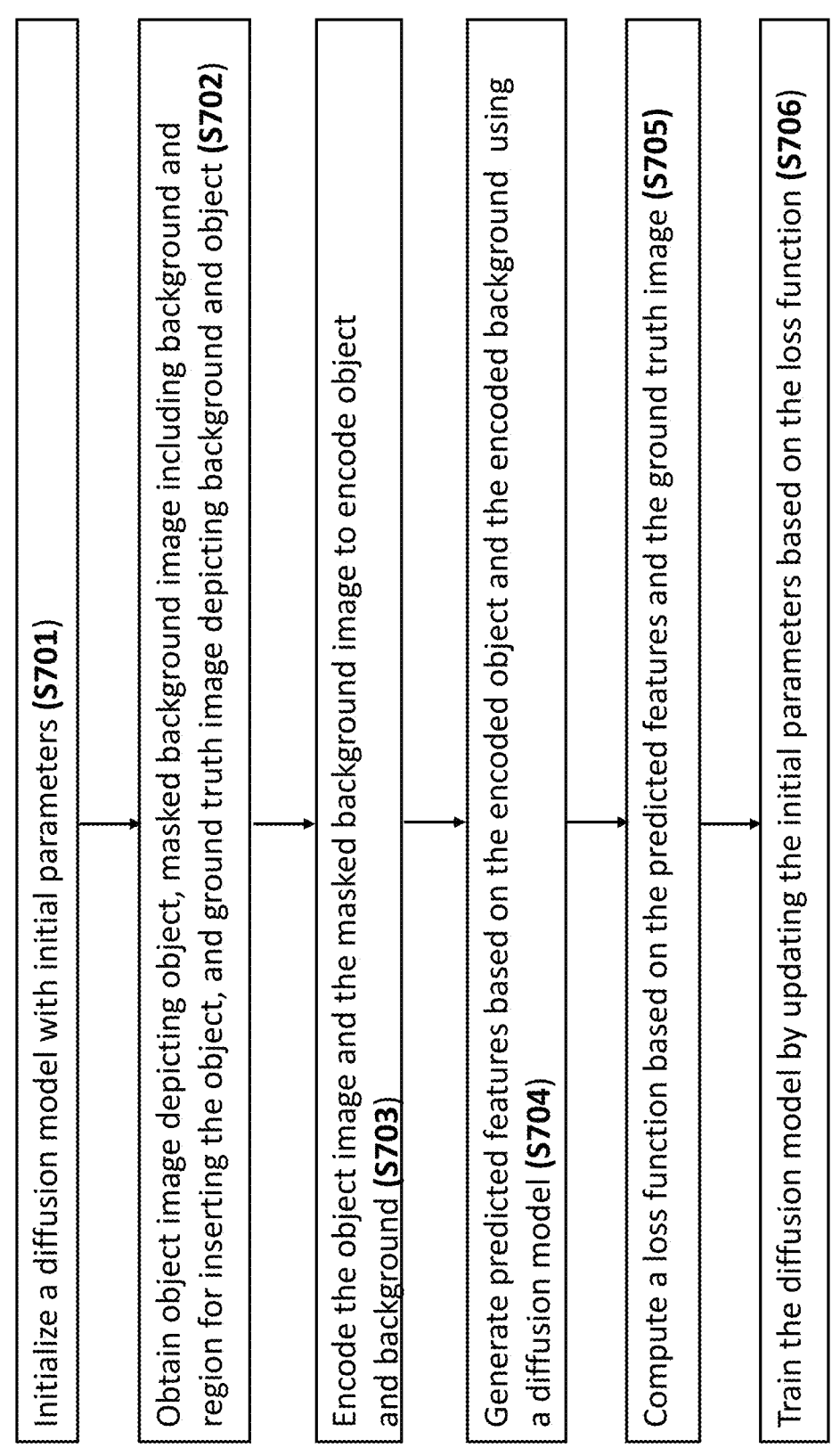

Initialize a diffusion model with initial parameters (S701)

Obtain object image depicting object, masked background image including background and region for inserting the object, and ground truth image depicting background and object (S702)

Encode the object image and the masked background image to encode object and background (S703)

Generate predicted features based on the encoded object and the encoded background using a diffusion model (S704)

Compute a loss function based on the predicted features and the ground truth image (S705)

Train the diffusion model by updating the initial parameters based on the loss function (S706)

FIG. 8A

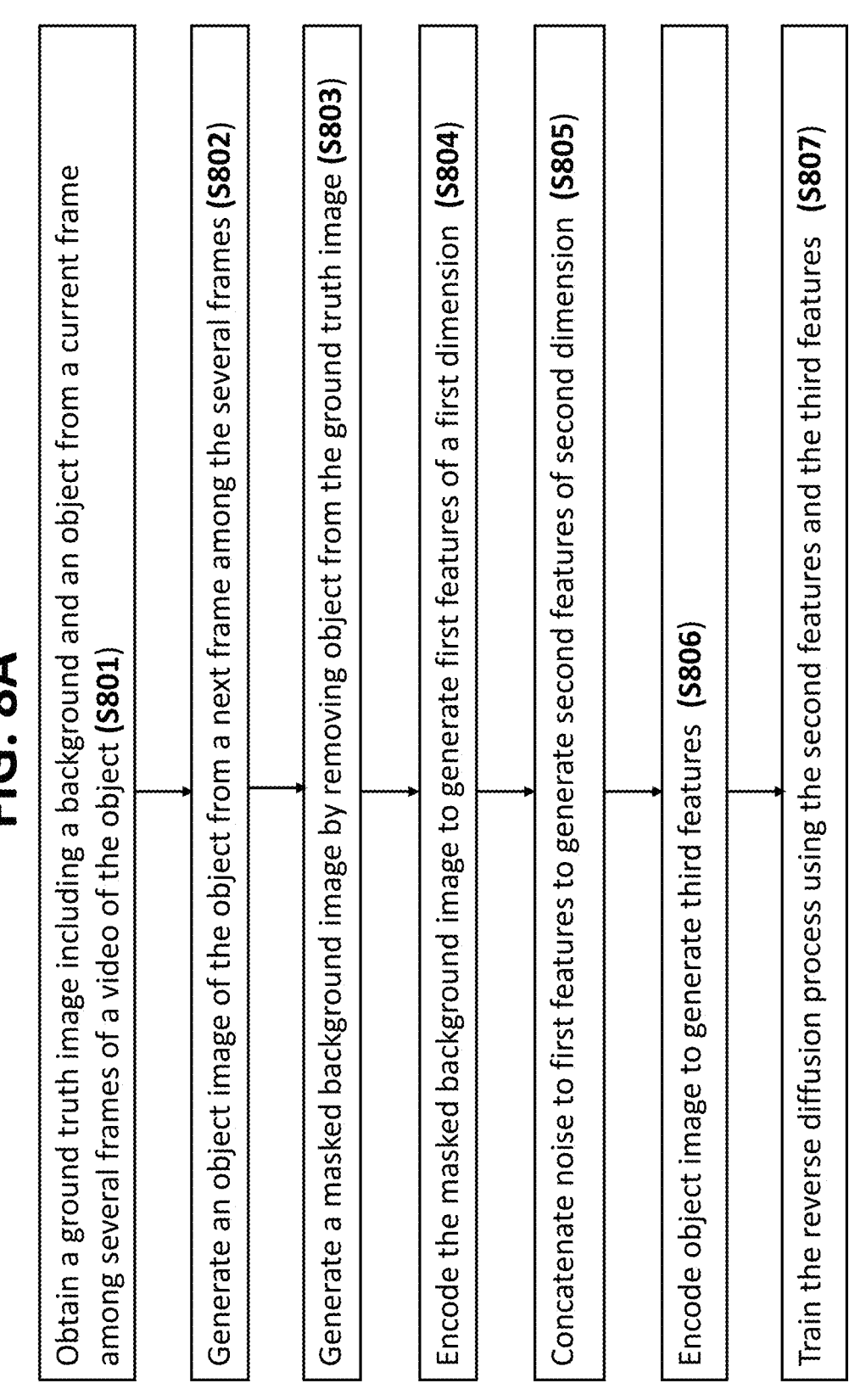

Obtain a ground truth image including a background and an object from a current frame among several frames of a video of the object (S801)

Generate an object image of the object from a next frame among the several frames (S802)

Generate a masked background image by removing object from the ground truth image (S803)

Encode the masked background image to generate first features of a first dimension (S804)

Concatenate noise to first features to generate second features of second dimension (S805)

Encode object image to generate third features (S806)

Train the reverse diffusion process using the second features and the third features (S807)

FIG. 8B

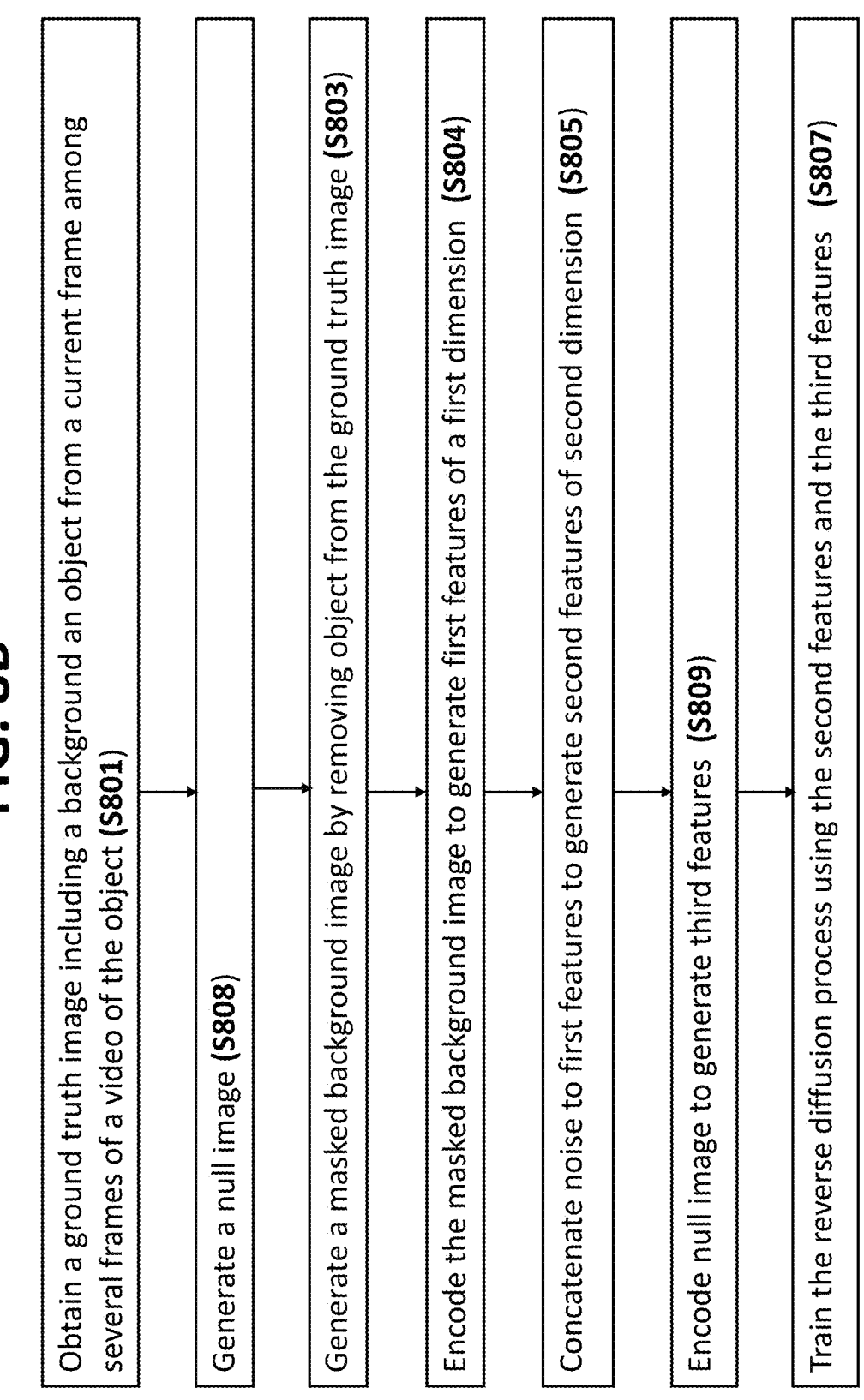

Obtain a ground truth image including a background an object from a current frame among several frames of a video of the object (S801)

Generate a null image (S808)

Generate a masked background image by removing object from the ground truth image (S803)

Encode the masked background image to generate first features of a first dimension (S804)

Concatenate noise to first features to generate second features of second dimension (S805)

Encode null image to generate third features (S809)

Train the reverse diffusion process using the second features and the third features (S807)

1000

MEMORY 1012

PROCESSOR(S) 1014

PRESENTATION COMPONENT(S) 1016

RADIO(S) 1024

I/O PORT(S) 1018

I/O COMPONENTS 1020

POWER SUPPLY 1022

1010

AFFORDANCE-BASED REPOSING OF AN OBJECT IN A SCENE

BACKGROUND

This disclosure relates generally to image processing, and more particularly to processing an image with a machine learning model.

Digital image processing generally refers to the use of a computer to edit a digital image (e.g., using an algorithm, a processing network, etc.). In some cases, image processing software may be used for various image processing tasks, such as image editing, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) may include using a machine learning model to generate images. Diffusion models are a class of generative artificial neural network (ANN) which can be trained to generate new data with features similar to features found in training data. In some cases, diffusion models can be used to generate images based on random noise.

SUMMARY

Systems, methods, and software are described herein for using a diffusion model to automatically insert an input object (e.g., a human being) or a random object into a background image in an appropriate pose, swap an object in the background image with an input object in an appropriate pose, or swap part of an object in the background image with a corresponding part of the object in an appropriate pose. The diffusion model is guided using the background image and may be additionally guided using the object.

According to an embodiment of the disclosure, a method of inserting an object into a background includes: obtaining a background image including a region for inserting the object; encoding the background image to obtain an encoded background; and generating a modified image based on the encoded background using a diffusion model, wherein the modified image depicts the object within the region.

According to an embodiment of the disclosure, a method for training a model to insert an object into a background includes: initializing a diffusion model obtaining training data including an object image depicting an object, a background image comprising a background and an object region for inserting an object, and a ground truth image depicting the background and the object in the object region; and training the diffusion model to generate a modified image that shows a version of the object within the object region in a different pose from the object in the object image based on the training data.

According to an embodiment of the disclosure, an apparatus for inserting an object into a background includes: one or more processors and one or more memories including instructions executable by the one or more processors to: obtain an object image depicting the object and a background image including a region for inserting the object; encode, using an image encoder, the object image to obtain an encoded object; encode, using a condition encoder, the background image to obtain an encoded background; and generate, using a diffusion model, a modified image based on the encoded object and the encoded background, wherein the modified image depicts the object within the region.

BRIEF DESCRIPTION OF THE DRAWINGS

The detailed description describes one or more embodiments with additionally specificity and detail through use of the accompanying drawings, briefly described below.

FIG. 1 illustrates a system for enabling a user to insert an image of an object into a background image.

FIG. 5A shows a method for training the Diffusion model according to an aspect of the present disclosure.

FIG. 5B shows an example of a method for training the Diffusion model according to an aspect of the present disclosure.

FIG. 7, FIG. 8A, FIG. 8B illustrate methods for training the Diffusion model according to embodiments of the present disclosure.

DETAILED DESCRIPTION

Figure 2:
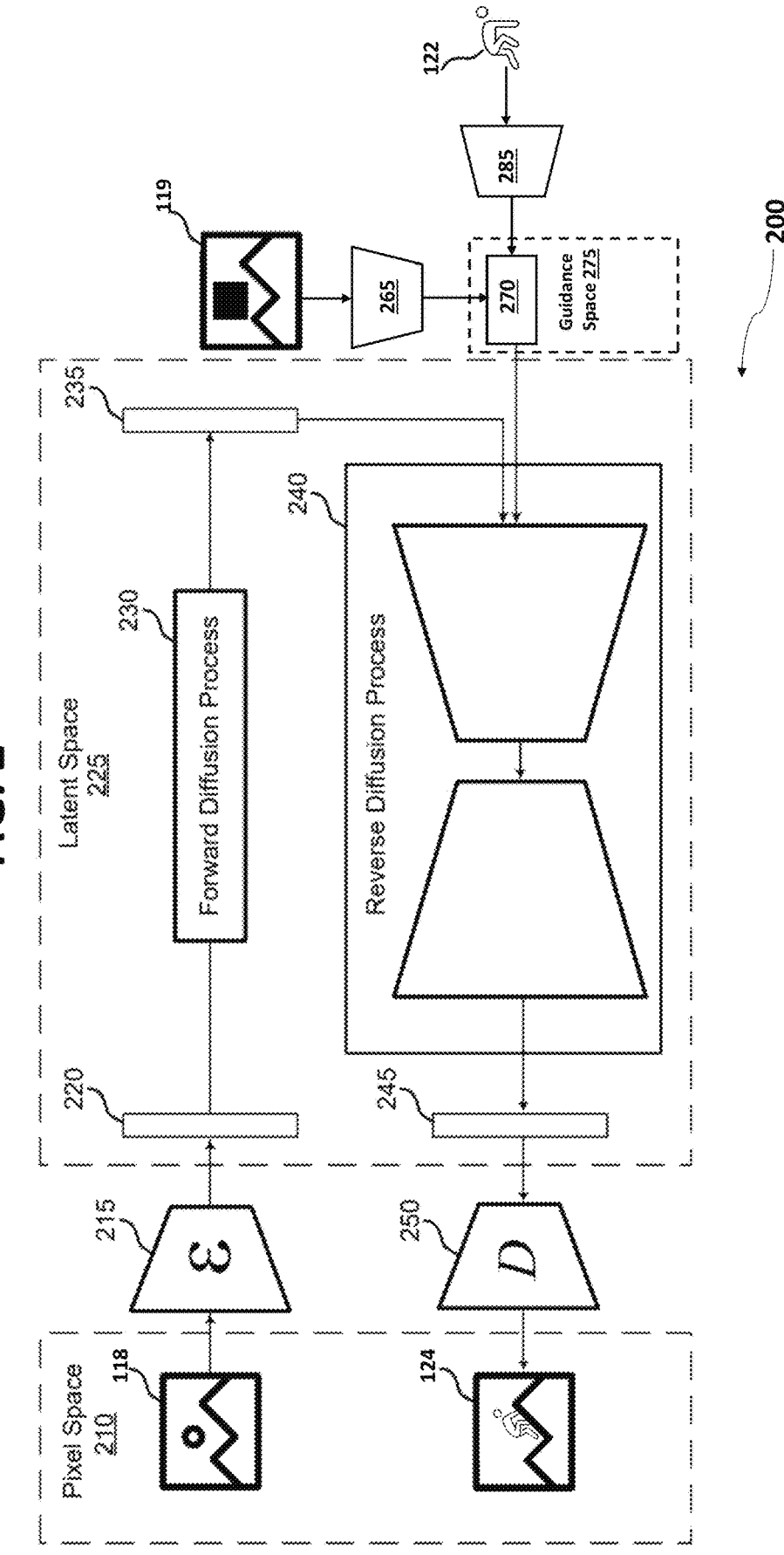
FIG. 2 illustrates a Diffusion Model according to an exemplary embodiment of the disclosure.

The present disclosure relates to image processing, including generating and editing images using a machine learning model. Embodiments of the disclosure provide systems and methods for inserting an object into a scene using a diffusion model.

A user may desire to insert an object (e.g., a human being) into a scene to create a new image. However, using traditional cut and paste tools to insert the object can result in images that appear fake since they do not consider affordances of other objects in the scene. An affordance is what a user can do with an object based on the user's capabilities. For example, if a chair is present in a scene, a person is able to sit on the chair, stand on the chair, etc. However, a traditional cut and paste tool would not cause an image of the person being inserted to automatically sit in the chair, stand on the chair, etc.

An existing approach for inserting an image of an object into a background image uses a cut function to cut the object from an object image and a paste function to paste the cut object into a position of the background image input by a user. However, since the pose of the cut object is maintained, this can result in an image that is not in sync with objects in the background and makes it easy for a user to detect the resulting image as being a fake image.

Another existing approach guides a diffusion model based on user input text to automatically generate an image. However, since this approach only considers the input text to generate an output image and the type of output image varies greatly based on the images used to train the model, it cannot be used insert an input object into an input background image. While diffusion models can be trained to conditionally generate an image based on textual guidance, textual guidance often does not provide enough information to repose an input object within an input background image in an appropriate pose.

Embodiments of the disclosure provide methods and systems for realistically inserting an object (e.g., a person) into a scene. Given an original image of the scene (e.g., a scene image) with a marked region and an optional image of an object (e.g., a person), an embodiment of the disclosure can synthesize a new scene image including an object from the original image, the marked region, and the optional image. A model (e.g., a diffusion model) is provided herein that is capable of learning to insert an object (e.g., a person) into scenes at scale, thereby demonstrating emergent affordances. The model can infer realistic poses given the scene context and a reference object (e.g., person) and harmonize the insertion.

The task may be setup in a self-supervised fashion by learning to repose objects (e.g., people) in video clips. During training, the input scene image and the input object image (e.g., of a person) may be sourced from two random frames in the same video. An embodiment of the disclosure can mask out a region around the object (e.g., the person) in a first frame and learn to inpaint using the object (e.g., the same person) from a second frame as a conditioning signal. This encourages the model to learn both the possible scene affordances given the context as well as any reposing and harmonization needed for a coherent image.

While a prior technique used human motion as a cue for affordance learning, such requires having plausible ground-truth poses. On the other hand, an embodiment of the disclosure works with a much larger dataset and learns affordances in a fully self-supervised generative manner to go beyond synthesizing pose alone to generate realistic humans conditioned on the scene. Further, embodiments of the disclosure generalize better to diverse scenes and poses and allow for greater scaling.

While another prior technique attempted to synthesize human images from conditional information, it did not take into account scene context to infer pose since the target pose was explicitly given. In contrast, a model (e.g., a diffusion model) according to an embodiment of the disclosure conditions based an input scene context and infers the right pose (affordance) prior to reposing. Further, the model may be trained on unconstrained real-word scenes.

The diffusion model (e.g., a large-scale diffusion model) according to an embodiment of the disclosure may be trained on a broad dataset of videos (e.g., millions of videos of humans moving in scenes) that produce diverse plausible target poses while respecting the scene context. Given the learned object-scene (e.g., human-scene) composition, the model can also hallucinate a realistic object (e.g., a person) and scenes when prompted without conditioning may also enable interactive editing. At inference time, the model can then be prompted with different combinations of scene and object (e.g., person) images. The model can also perform partial human completion tasks such as changing the pose or swapping clothes.

Accordingly, by providing a target region for an object, and training a diffusion model to insert the object in the target region, embodiments of the present disclosure enable users to generate images that include objects with an appropriate pose and orientation. Thus, these embodiments provide an improvement over existing image generation models that do not pose objects based on the background. For example, when compared to existing models, embodiments of the disclosure synthesize more realistic human insertions with better affordance prediction as measured by a Frdchet inception distance (FID) and percent of correct keypoints (PCKh), respectively. Furthermore, at least one embodiment of the disclosure inserts an object into a region of a background image to generate a modified image that is more realistic by guiding a diffusion model to generate the modified image using features of the object and features of the region.

Image Processing System

Figure 1:
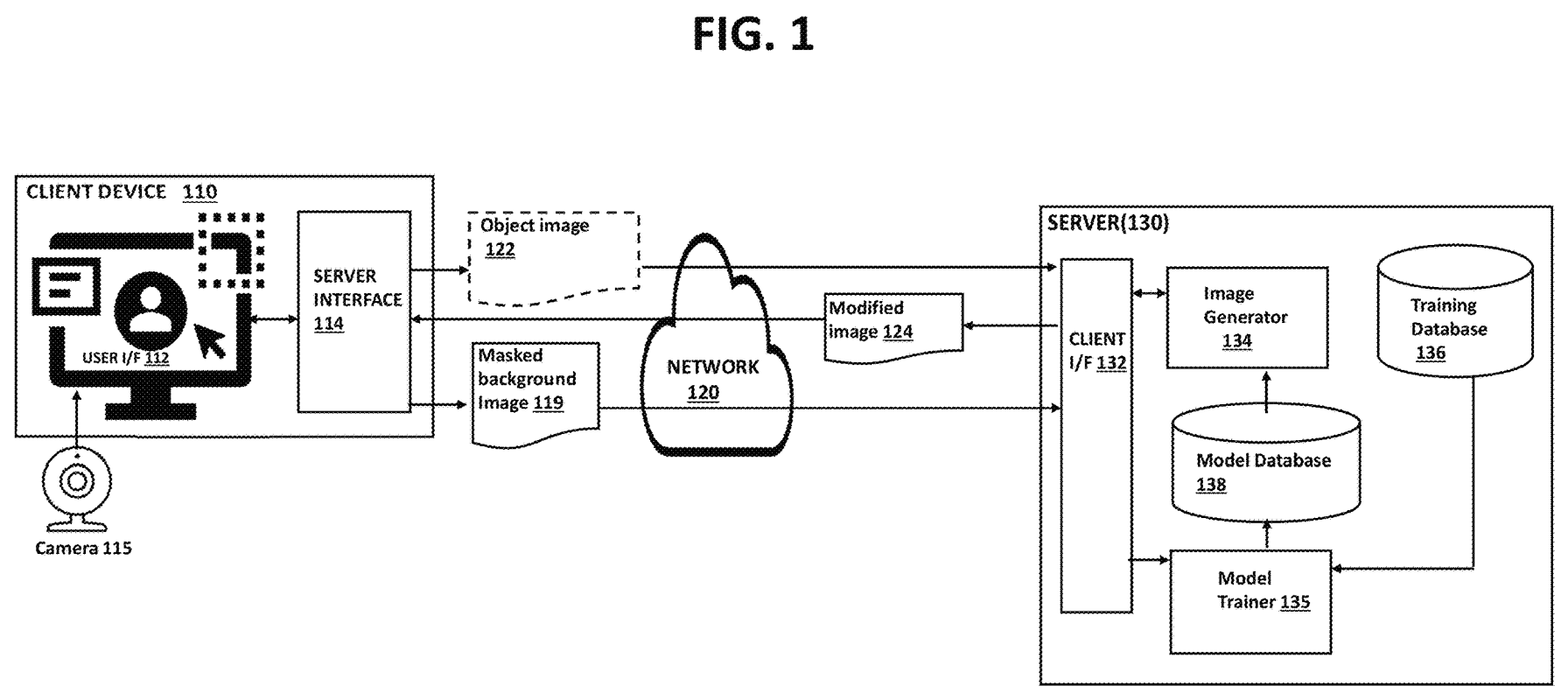

Exemplary embodiments of the inventive concept are applicable to a client-server environment and a client-only environment. FIG. 1 shows an example of the client-server environment, where a user uses a graphical user interface 112 of a client device 110 to create a modified image 124 from a masked background image 119 generated from masking out a region of a background image, and an object image 122 (e.g., an image of a human being).

In an embodiment, the user interface 112 presents a user with an option that enables the user to choose whether to insert a random object (e.g., a human being) into a region of the background image 118 or to insert an input object into the region.

In an embodiment, the user interface 112 enables the user to select the background image from a list of available images or use a camera 115 to capture the background image after choosing whether to insert the random object or to insert the input object, mark a region of the background image for inserting the object, and generate the masked background image 119 by masking out the region from the background image. For example, the user interface 112 may enable a user to use a mouse to draw a rectangle or one of various other regular shapes (e.g., a square, circle, etc.) or irregular shapes (e.g., random scribble) on the background image to identify coordinates, boundaries, and/or dimensions of the region of the background image to insert the object. If the user chooses to insert an input object instead of a random object, the user interface 112 enables the user to select an object image 122 from a list of available images or use the camera 115 to capture the object image 122.

In an embodiment, the object image 122 is generated from a preliminary object image that includes an object to insert, a background, and potentially other objects, and all of the pixels of the object image 122 except for the object to insert or part of the object to insert are removed from the preliminary object image to generate the object image 122. For example, the user may provide a mask input using the client user interface 112 to crop out all or part of the object to insert. In another example, the object image 122 is created automatically by a processor (e.g., 1014 in FIG. 12) executing an image segmentation algorithm stored in memory (e.g., 1012 in FIG. 12) on the preliminary object image to divide the preliminary object image into one or more objects, the user selects one of the objects resulting from the segmentation using the client user interface 112, and the object image 122 is generated from the selected one object.

In an embodiment, the server interface 114 outputs the masked background image 119 across the computer network 120. The server interface 114 may additionally output the object image 122 across the computer network 120 if the user chooses to insert an input object.

A client interface 132 of the server 130 forwards the received data (e.g., masked background image 119 and the object image 122 when present) to an image generator 134. The image generator 134 generates a modified image 124 from the received data using a previously trained Diffusion model retrieved from the model database 138. The Diffusion model was previously by a Model Trainer 135 based on training data stored in the Training Database 136. The training of the Diffusion model will be discussed in greater detail below.

According to an embodiment of the disclosure in a client-only environment, one or more of the Image Generator 134, the Model Trainer 135, the Model Database 138, and the Training Database 136 are present on the client device 110. For example, in certain embodiments, the client device 110 generates the modified image 124 locally without reliance on the server 130.

The computer network 120 may be wired, wireless, or both. The computer network 120 may include multiple networks, or a network of networks, but is shown in a simple form so as not to obscure aspects of the present disclosure. By way of example, the computer network 120 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client device 110 includes one or more processors, and one or more computer-readable media. The computer-readable media may include computer-readable instructions executable by the one or more processors. The instructions may correspond to one or more applications, such as software to manage the graphical user interface 112, software to output the data (e.g., masked background image 119, and object image 122 when present), and software to receive the modified image 124.

The server 130 includes a plurality of computing devices configured in a networked environment or includes a single computing device. Each server 130 computing device includes one or more processors, and one or more computer-readable media. The computer-readable media may include computer-readable instructions executable by the one or more processors. The instructions may correspond to one or more applications, such as software to interface with the client device 110 for receiving the data (e.g., the masked image background 119, and the object image 122 when present) and outputting the modified image 124.

FIG. 2 illustrates the Diffusion model (e.g., 200) according to an exemplary embodiment of the disclosure. Diffusion models are a class of generative artificial neural network that can be trained to generate new data with features similar to features found in training data. As an example, the Diffusion model 200 may a Denoising Diffusion Probabilistic Model (DDPM) or a Denoising Diffusion Implicit Model (DDIM). In DDPMs, the generative process includes reversing a stochastic Markov diffusion process. DDIMs, on the other hand, use a deterministic process so that the same input results in the same output.

Diffusion models may also be characterized by whether the noise is added to the image itself, or to image features generated by an encoder (i.e., latent diffusion). In an exemplary embodiment, the Diffusion model 200 is a latent diffusion model since noise is added to image features generated by an encoder. The Diffusion model 200 iteratively adds noise to data input during a forward process and then learns to recover the data by denoising the data during a reverse process. For example, during training, the Diffusion model 200 takes a background image 118 in a pixel space 210 as input and applies a forward diffusion process 230 to gradually add noise to the background image 118 to obtain noisy images 235 at various noise levels. During training, a mixture of masks may be used to hide all or part of objects within the background image 118. The background image 118 may include various objects, and one or more of these objects may be a human being.

For fixed time steps T, the forward diffusion process 230 gradually adds noise and approximates samples at t=T as uniform Gaussian noise.

Next, a reverse diffusion process 240 (e.g., a U-Net ANN) gradually removes the noise from the noisy images 235 at the various noise levels to obtain the modified image 124. The modified image 124 can be compared to the background image 118 to train the reverse diffusion process 240.

The reverse diffusion process 240 then learns to denoise the noise into samples in T steps. The model effectively predicts $\epsilon\theta(x_t, t)$ for t=1 . . . T, the noise level at time-step t given $x_t$, a noisy version of input x. The corresponding simplified training objective can be represented as:

$$L_{DM} \overset{\text{def}}{=} \mathbb{E}_{x, \epsilon \sim \mathcal{N}(0,1), t}[\|\epsilon - \epsilon_\theta(x_t, t, c)\|_2^2], \tag{1}$$

where t is uniformly sampled from $\{1, \ldots, T\}$ and c are the conditioning variables, the masked background image and the reference person or object.

An autoencoder is used to do perceptual compression and a diffusion model (e.g., 200) focuses on the semantic details. Down-sampling the input image from pixel space 210 to latent space 225 makes the training more computationally efficient. Given an autoencoder with encoder E and decoder D, the updated objective can be represented as follows:

$$L_{LDM} \overset{\text{def}}{=} \mathbb{E}_{\varepsilon(x), \epsilon \sim \mathcal{N}(0,1), t}[\|\epsilon - \epsilon_\theta(\varepsilon(x_t), t, c)\|_2^2], \tag{2}$$

The updated noise-prediction can be represented as:

$$\hat{\epsilon} = w \cdot \epsilon_\theta(x_t, t, c) - (w-1) \cdot \epsilon_\theta(x_t, t), \tag{3}$$

During training, the Diffusion model 200 takes the background image 118 in a pixel space 210 as input and applies an image encoder 215 to convert the background image 118 into original image features 220 in a latent space 225. Then, the forward diffusion process 230 gradually adds noise to the original image features 220 to obtain noisy features 235 (also in latent space 225) at various noise levels.

The reverse diffusion process 240 (e.g., a U-Net ANN) gradually removes the noise from the noisy features 235 at the various noise levels to obtain denoised image features 245 in the latent space 225. In some examples, the denoised image features 245 are compared to the original image features 220 at each of the various noise levels, and parameters (e.g., weights) of the reverse diffusion process 240 of the diffusion model 200 are updated based on the comparison. Finally, an image decoder 250 decodes the denoised image features 245 to obtain the modified image 124 in the pixel space 210. The modified image 124 can be compared to the original background image 118 to train the reverse diffusion process 240.

The reverse diffusion process 240 is guided based on the masked background image 119 and the object image 122 when the object image 122 is present. The masked background image 119 can be encoded using an encoder 265 (e.g., a multimodal encoder, a variational autoencoder (VAE) used in stable diffusion, etc.) and the object image 122 can be encoded using another encoder 285 (e.g., a multimodal encoder, a VAE, etc.) to obtain guidance features 270 in a guidance space 275. In an embodiment, the multimodal encoder is based on CLIP encoder used in stable diffusion, which is a multi-modal vision and language model. However, the inventive concept is not limited to a CLIP encoder, as various other encoders may be used. The guidance features 270 can be combined with the noisy images 235 at one or more layers of the reverse diffusion process 240 to ensure that the modified image 124 includes content described by the masked background image 119 and the object image 122. Thus, the diffusion model 200 may receive the encoded object image and the encoded masked image as inputs. The guidance features 270 can be combined with the noisy features using a cross-attention block within the reverse diffusion process 240.

In an embodiment, a first pose of the object in the object image 122 is different from a second pose of the object in the modified image 124, and the second pose is determined by the diffusion model 200 based on the masked background image 119. The diffusion model 200 may determine the second pose additionally based on the object image 122.

In some cases, the image encoder 215 and the image decoder 250 are pre-trained prior to training the reverse diffusion process 240. In some examples, they are trained jointly, or the image encoder 215 and image decoder 250 are fine-tuned jointly with the reverse diffusion process 240.

Figure 3:
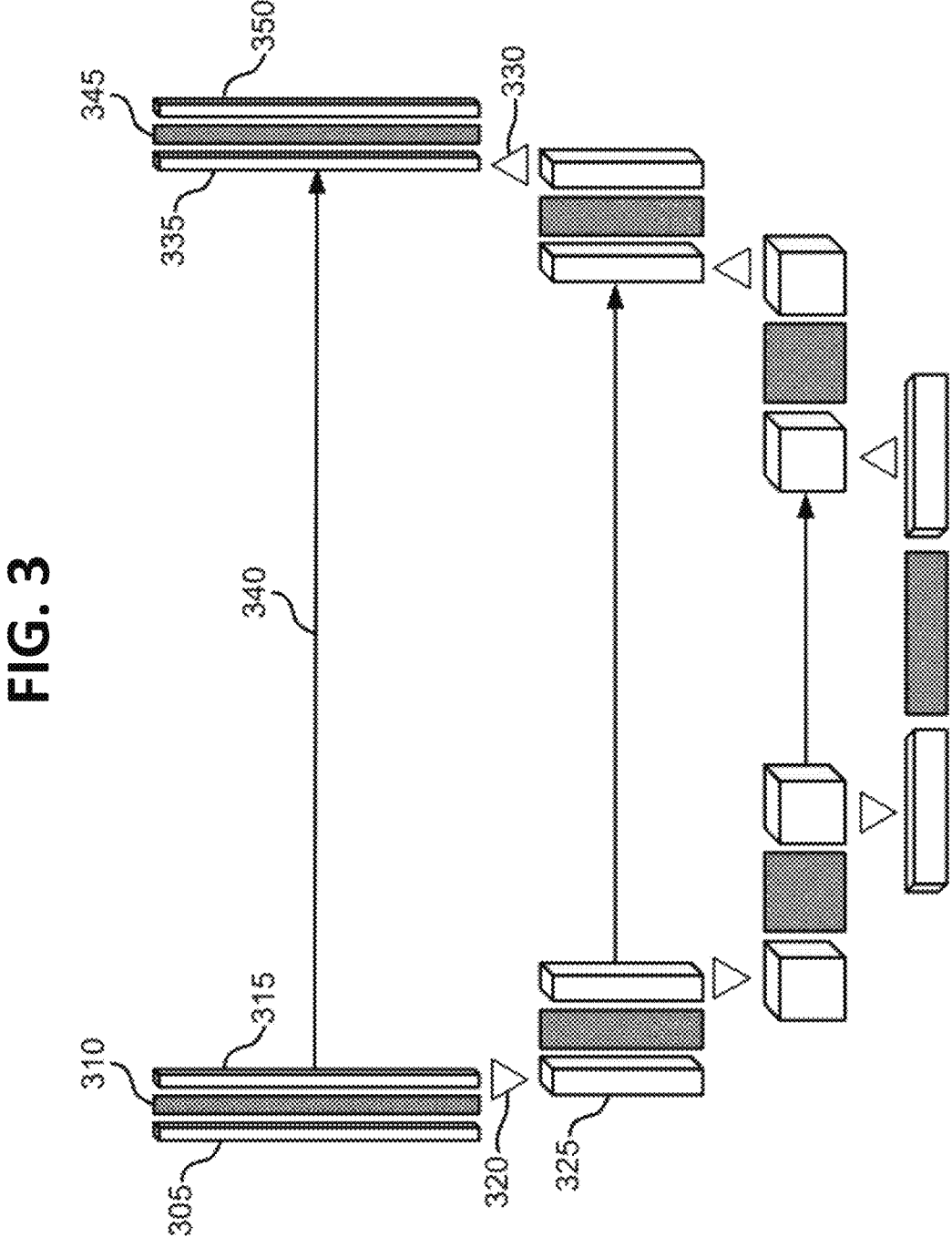
FIG. 3 illustrates an example of a U-Net that may be used to implement a reverse diffusion process of the Diffusion Model.

FIG. 3 shows an example of a U-Net 300 that may be used to implement the reverse diffusion process 240. The U-Net 300 takes input features 305 having an initial resolution and an initial number of channels, and processes the input features 305 using an initial neural network layer 310 (e.g., a convolutional network layer) to produce intermediate features 315. The intermediate features 315 are then down-sampled using a down-sampling layer 320 such that down-sampled features 325 features have a resolution less than the initial resolution and a number of channels greater than the initial number of channels.

This process is repeated multiple times, and then the process is reversed. That is, the down-sampled features 325 are up-sampled using up-sampling process 330 to obtain up-sampled features 335. The up-sampled features 335 can be combined with intermediate features 315 having a same resolution and number of channels via a skip connection 340. These inputs are processed using a final neural network layer 345 to produce output features 350. In some cases, the output features 350 have the same resolution as the initial resolution and the same number of channels as the initial number of channels.

In an embodiment, the U-Net 300 takes additional input features to produce conditionally generated output. For example, the additional input features could include a vector representation of the masked background image 119 and the object image 122. The additional input features can be combined with the intermediate features 315 within the neural network at one or more layers. For example, a cross-attention module or block can be used to combine the additional input features and the intermediate features 315.

Figure 4:
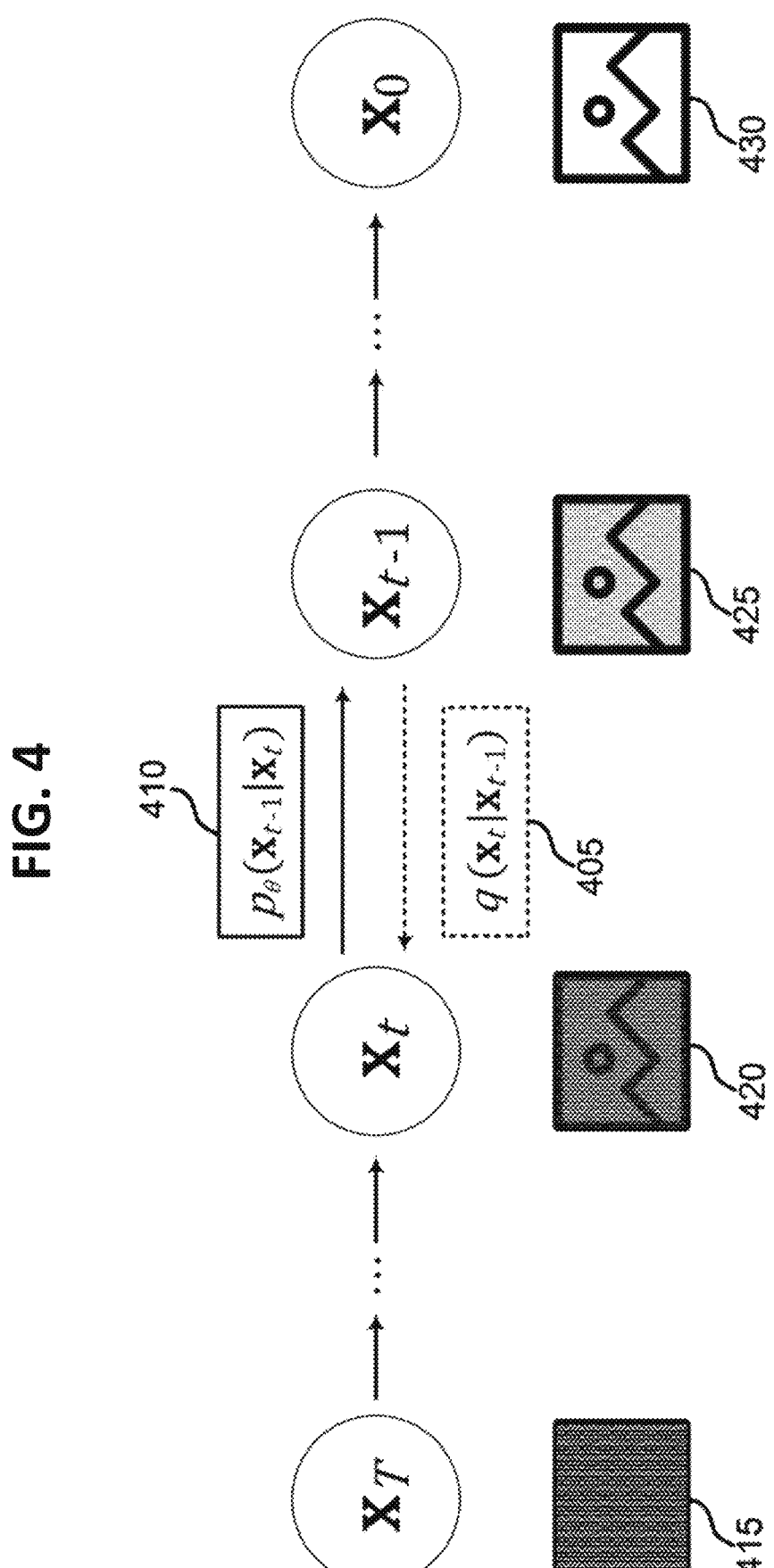
FIG. 4 illustrates a diffusion process that may be used to implement a portion of the Diffusion Model.

FIG. 4 shows a diffusion process 400 according to aspects of the present disclosure. As described above with reference to FIG. 1, a diffusion model can include both a forward diffusion process 405 (e.g., see 230 of FIG. 1) for adding noise to an image (or features in a latent space) and a reverse diffusion process 410 (e.g., see 240 of FIG. 1) for denoising the images (or features) to obtain a denoised image. The forward diffusion process 405 can be represented as $q(x_t|x_{t-1})$, and the reverse diffusion process 410 can be represented as $p(x_{t-1}|x_t)$. In some cases, the forward diffusion process 405 is used during training to generate images with successively greater noise, and a neural network is trained to perform the reverse diffusion process 410 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 410, the model begins with noisy data $x_T$, such as a noisy image 415 and denoises the data to obtain the $p(x_{t-1}|x_t)$. At each step t−1, the reverse diffusion process 410 takes $x_t$, such as first intermediate image 420, and t as input. Here, t represents a step in the sequence of transitions associated with different noise levels, The reverse diffusion process 410 outputs $x_{t-1}$, such as second intermediate image 425 iteratively until $x_T$ is reverted back to $x_0$, the original image 430. The reverse process can be represented as:

$$p_\theta(x_{t-1}|x_t):=\mathcal{N}(x_{t-1};\mu_\theta(x_t,t),\Sigma_\theta(x_t,t)). \quad (4)$$

The joint probability of a sequence of samples in the Markov chain can be written as a product of conditionals and the marginal probability:

$$x_T:p_\theta(x_{0:T}):=p(x_T)\Pi_{t=1}^T p_\theta(x_{t-1}|x_t), \quad (5)$$

where $p(x_T)=\mathcal{N}(x_T;0,I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Model Training

Figure 5A:
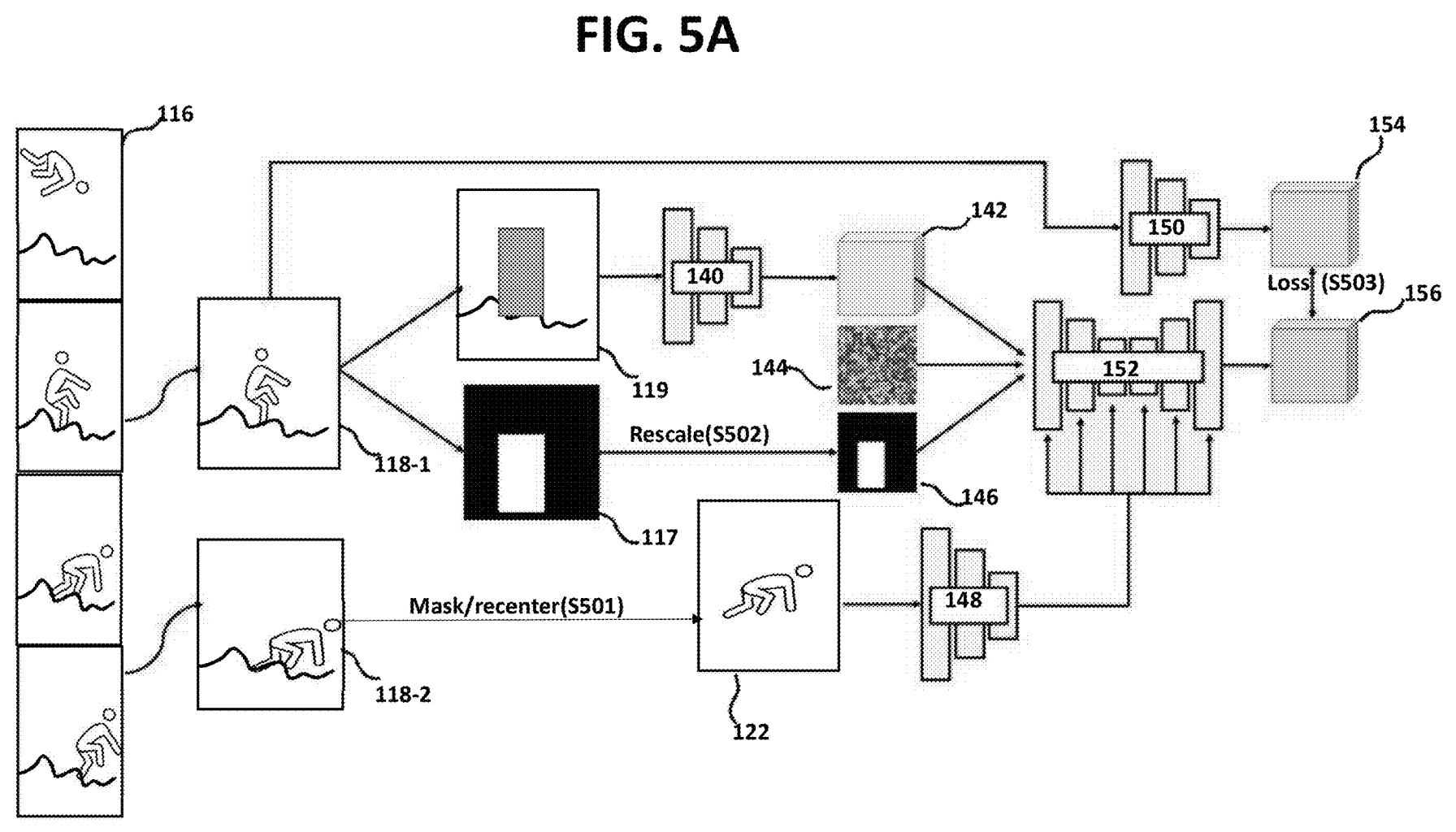

FIG. 5A a method for training the diffusion model according to aspects of the present disclosure. Two random frames 118-1 and 118-2 are selected from a video clip 116 (e.g., a movie) of a moving person. The person is masked out from the first frame 118-1 to generate the masked background image 119. A mask 117 may be used to mask out the person. The mask 117 maybe rescaled as needed to generate a rescaled mask 146. The masked background image 119 is output an encoder 140 of the model to generate latent features 142. The encoder 140 may be a variational autoencoder (VAE). A masking and centering operation may be performed on the second frame 118-2 to generate the object image 112 (S501). For example, a segmentation algorithm may be performed on the second frame 118-2 to extract the person and a new image may be generated including only the extracted person in a center of the new image to generate the second frame 118-2. The object image 122 may be output to a multi-modal encoder 148 of the model to generate conditioning features to inpaint the image. The multi-modal encoder 140 may be a Contrastive Language-Image Pre-training (CLIP) encoder. The latent features 142, the re-scaled mask 146, and a noise map 144 may be concatenated together for output to a De-noising network 152 (e.g., a time-conditional U-Net), where the conditioning features are passed to the network 152 via cross-attention to generate predicted latent features 156. The noise map 144 may be obtained by noising (e.g., adding noise) the features 154 in FIG. 5A. The mask 117 and the masked background image 119 may be concatenated as they are spatially aligned with the final output whereas the reference person (e.g., 122) may be injected through cross-attention as it would not be aligned due to having a different pose.

For example, the person is masked out from the first frame 118-1 and used as an input scene; and the person is cropped out from the second frame 118-2, centered, and used as reference person conditioning. Color augmentation (e.g., brightness, contrast, and saturation), image filter and corruptions may be randomly applied to the second frame 118-2 before the cropping and centering. After the cropping and centering, geometric augmentations (e.g., isotropic-scaling, anistropic-scaling, rotation, and cutout) may be randomly applied for generating the object image 122.

The model may be a conditional latent diffusion model trained on both the masked scene image (e.g., the masked background image 119 and the mask 146) and the reference person image 122. This encourages the model to infer the right pose given the scene context, hallucinate person-scene interactions and harmonize the reposed person into the scene seamlessly in a self-supervised manner. At test time, the model can be used to support multiple applications, such as inserting different reference humans, hallucinating humans without reference, and/or hallucinating scenes given the human. Conditional signals may be randomly dropped during training. For example, the person-conditioning may be dropped 10% of the time, and the masked background image and person-conditioning may be dropped 10% of the time to learn a full unconditional distribution and support classifier-free guidance. However, the model is not limited to a conditional latent diffusion model. For example, the model could be a pixel diffusion model.

A loss (e.g., an L1 loss) of the predicted features 156 may be calculated from target features 154 calculated from the first frame 118-1. For example, target features 154 may be calculated by inputting the first frame 118-1 to a VAE 150. The De-noising network 152 may be updated based on the loss.

The video clip 116 may be one of a first plurality (e.g., 2.4 million) of videos determined from a larger second plurality (e.g., 12 million) of videos. The second plurality may include a combination of publicly available computer vision datasets and proprietary data sets. The second plurality may be resized to a shorter-edge resolution (e.g., 256 pixels) to retain 256×256 cropped segments with a single person detected by a Keypoint R-CNN, and videos may be filtered out where OpenPose (e.g., a real-time multi-person human pose recognition library) does not detect a sufficient number of keypoints to generate the first plurality. Some of the second plurality (e.g., 50,000 videos) may be used as a validation set and the rest may be used for training.

In an embodiment, a MASK R-CNN may be used to detect person masks to mask out humans in an input scene image and crop out humans to create the reference person (e.g., 122). The masking may use one various masking combinations such as randomly dilated person bounding boxes, randomly sampled larger boxes around the person, randomly sampled smaller bounding boxes within the person, randomly dilated person segmentation masks, and randomly generated scribbles or brush masks. This masking strategy may enable people to be inserted at different levels of granularity (i.e., inserting the full person, partially completing a person, or swapping clothes).

FIG. 5B shows an example of a method 500 for training the diffusion model according to aspects of the present disclosure. The method 500 represents an example for training a reverse diffusion process as described above with reference to FIG. 4. In some examples, these operations are performed by a system including a processor executing a set of codes to control functional elements of an apparatus, such as the apparatus described in FIG. 1.

Additionally or alternatively, certain processes of method 500 may be performed using special-purpose hardware. Generally, these operations are performed according to the methods and processes described in accordance with aspects of the present disclosure. In some cases, the operations described herein are composed of various sub-steps, or are performed in conjunction with other operations.

At operation 505, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 510, the system adds noise to a training image using a forward diffusion process in N stages. For example, the training image may come from the Training Database 136 of FIG. 1. In some cases, the forward diffusion process is a fixed process where Gaussian noise is successively added to an image. In latent diffusion models, the Gaussian noise may be successively added to features in a latent space.

At operation 515, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 520, the system compares a predicted image (or image features) at stage n−1 to an actual image (or image features), such as the image at stage n−1 or the original input image. For example, given observed data x, the diffusion model may be trained to minimize the variational upper bound of the negative log-likelihood $-\log \rho_{\theta}(x)$ of the training data.

At operation 525, the system updates parameters of the model based on the comparison. For example, parameters of a U-Net may be updated using gradient descent. Time-dependent parameters of the Gaussian transitions can also be learned.

Figure 6:
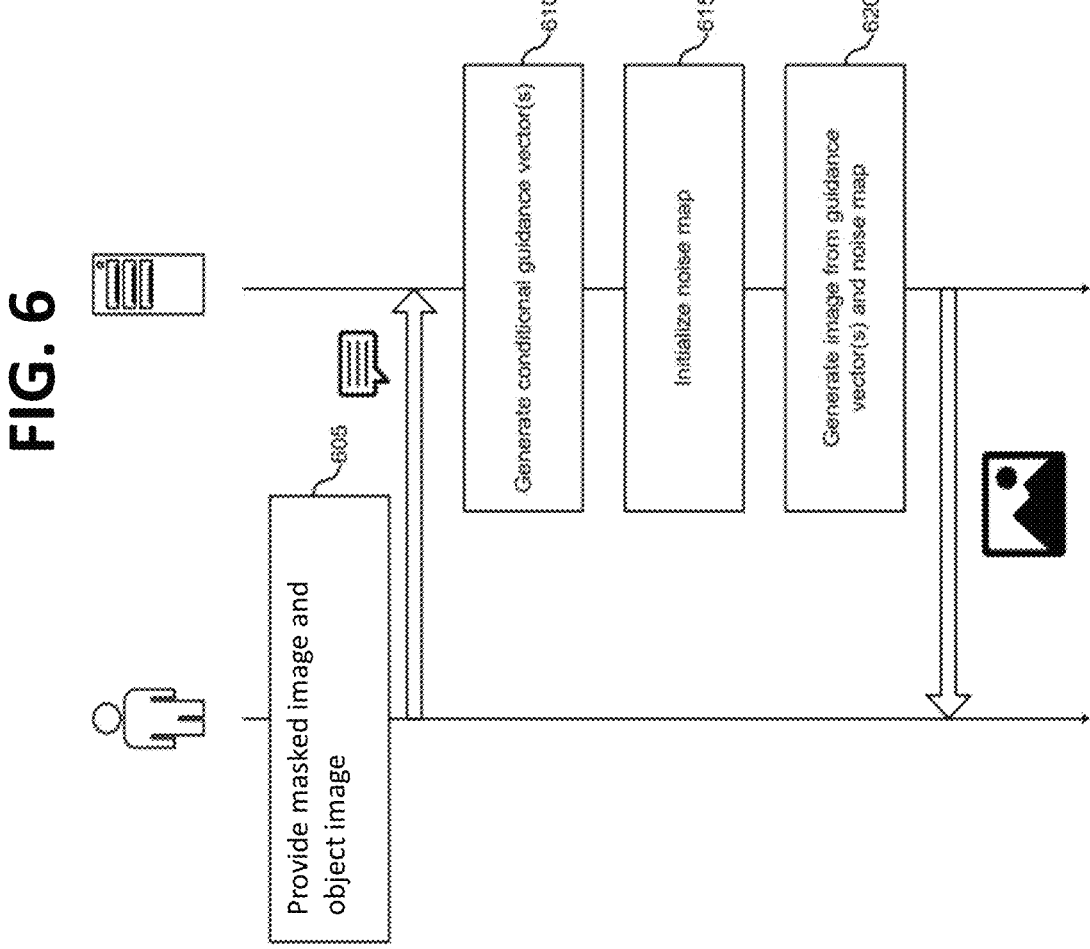
FIG. 6 an example of a method for conditional image generation according to an aspect of the present disclosure.

FIG. 6 shows an example of a method 600 for conditional image generation according to aspects of the present disclosure. In some examples, these operations are performed by a system including a processor executing a set of codes to control functional elements of an apparatus such as the apparatus described in FIG. 1.

Additionally or alternatively, steps of the method 600 may be performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides a masked background image 119 and an object image 122 describing content to be included in a generated image. The masked background image 119 may include a background scene with a region where pixels were removed to allow insertion of all or part of an object into the region of the object image 122. The background image 118 may omit the object or include the object in a pose that differs from a desired pose. In one example, the background image 118 included the object, part of the object is located in the region, and thus the masked background image 119 includes only part of the object.

At operation 610, the system converts the masked background image 119 and the object image 122 into a conditional guidance vector or other multi-dimensional representation. For example, the masked background image 119 and the object image 122 may be converted into a vector or a series of vectors using a transformer model, or a multi-modal encoder. In some cases, the encoder for the conditional guidance is trained independently of the diffusion model. In an embodiment, the object image 122 is a null or null image, an in this embodiment, the model generates a random object such as a person.

At operation 615, a noise map is initialized that includes random noise. The noise map may be in a pixel space or a latent space. By initializing an image with random noise, different variations of an image including the content described by the conditional guidance can be generated.

At operation 620, the system generates an image (e.g., the modified image 124) based on the noise map and the conditional guidance vector. For example, the image may be generated using a reverse diffusion process as described with reference to FIG. 4.

FIGS. 7 and 8A-8B illustrate methods for training a diffusion model according to an exemplary embodiment.

The method of FIG. 7 includes initializing a diffusion model with initial parameters (S701). For example, weights in nodes of layers of a neural network of the diffusion model may be set based on the initial parameters.

The method of FIG. 7 includes obtaining an object image (e.g., 122) depicting an object, a masked background image (e.g., 119) including a background and a region for inserting the object, and a ground truth image depicting the background and the objection (S702). For example, the object image may be obtained by extracting the object from a first frame of a video depicting the object in multiple frames, the masked background image may be obtained by removing the object from a second other frame of the video, and the ground truth image may be based on the second frame or another one of the frames.

The method of FIG. 7 further includes encoding the object image to obtain an encoded object and the masked background image to obtain an encoded background (S703). For example, encoder 285 may encode an object image 122 and encoder 265 may encode the masked background image 119.

The method of FIG. 7 further includes generating predicted features based on the encoded object and the encoded background using the Diffusion model (S704). For example, the encoded object and the encoded background maybe provided as conditional guidance to Diffusion model 200.

The method of FIG. 7 further includes computing a loss function based on the predicted features and the ground truth image (S705). The loss function may include a reconstructed loss. In an embodiment, the loss function is an L1 loss function or a based on Least Absolute Deviations. The L1 loss function may be used to minimize the error, which is the sum of all the absolute differences between the true value and the predicted value. The loss function may be updated by re-performing steps S702-S705 one or more times. In an embodiment, during a minority of the times (e.g., 10%, 20%, etc.), the object image 122 is a null image so that the Diffusion model 200 does not receive guidance from the object image. Thus, the Diffusion model 200 may be trained without conditional object guidance for some iterations of its training. Noise may be added to the ground truth image at a plurality of different noise levels to obtain a plurality of noise maps using a forward diffusion process and the loss function may be computed based on the noise maps at the different noise levels.

The method of FIG. 7 further includes training the diffusion model by updating the initial parameters based on the loss function (S706).

The method of FIG. 8A includes obtaining a ground truth image including a background and an object from a current frame among several frames of a video of the object (S801). The video may provide images of a same object (e.g., a person) in different poses. The video may be selected from a plurality of videos of the same object and different objects.

The method of FIG. 8A further includes generating an object image of the object from a next frame among the several frames (S802). For example, when the object image is generated from a different frame from that of the ground truth image, the pose of the object may be different in the object image as compared to the ground truth image.

The method of FIG. 8A further includes generating a masked background image (e.g., a masked image) by removing the object from the ground truth image (S803). For example, pixels of the ground truth image corresponding to the object may be change to a different color such as black. Further, a region of the ground truth image having a regular shape (e.g., a square, circle, etc.) or an irregular shape (e.g., a random scribble) surrounding the object in the ground truth image may be removed or set to a same color to generate the masked background image. An image segmentation algorithm may be performed on the ground truth image to automatically identify the object and the identified object may be removed from the ground truth image to generate the masked background image by setting pixels of the identified object to a same color such as black.

The method of FIG. 8A further includes encoding the masked background image to generate first features of a first dimension (S804). For example, the encoder 265 of FIG. 2 could generate the first features.

The method of FIG. 8A further includes concatenating noise to the first features to generate second features of a second dimension (S805). The noise may be one of a plurality of different noise maps. The second dimension is higher than the first dimension since rather than change values of the first features, additional channels of noise are concatenated after the first features.

The method of FIG. 8A further includes encoding the object image to generate third features (S806). For example, the encoder 285 of FIG. 2 could generate the third features.

The method of FIG. 8A further includes training the reverse diffusion process (e.g., U-Net) using the second features and the third features (S807). For example, the reverse diffusion process could correspond to process 240 of FIG. 2 or the U-Net of FIG. 3.

FIG. 8B illustrates a training method similar to FIG. 8A, but which is performed on a minority of the frames of the video, such as 10%, 20%, etc. of the time. For example, FIG. 8A could be performed on 9 consecutive pairs of frames while FIG. 8B could be performed on a tenth pair consecutive to the 9 consecutive pairs. Step S802 of FIG. 8A is replaced in FIG. 8B with a step of generating a null image (S808). A null image is a blank image or an image including pixels of the same color such as all black having a same size as that of the object image 122. Further, Step S802 of FIG. 8A is replaced in FIG. 8B with a step of encoding the null image to generate the third features (S809). The null image allows the model to learn an unconditional distribution without a reference person or without a masked image. The methods of FIG. 8A and FIG. 8B may then be repeated with respect to another video or another portion of the same video.

Image Generation

Figure 9:
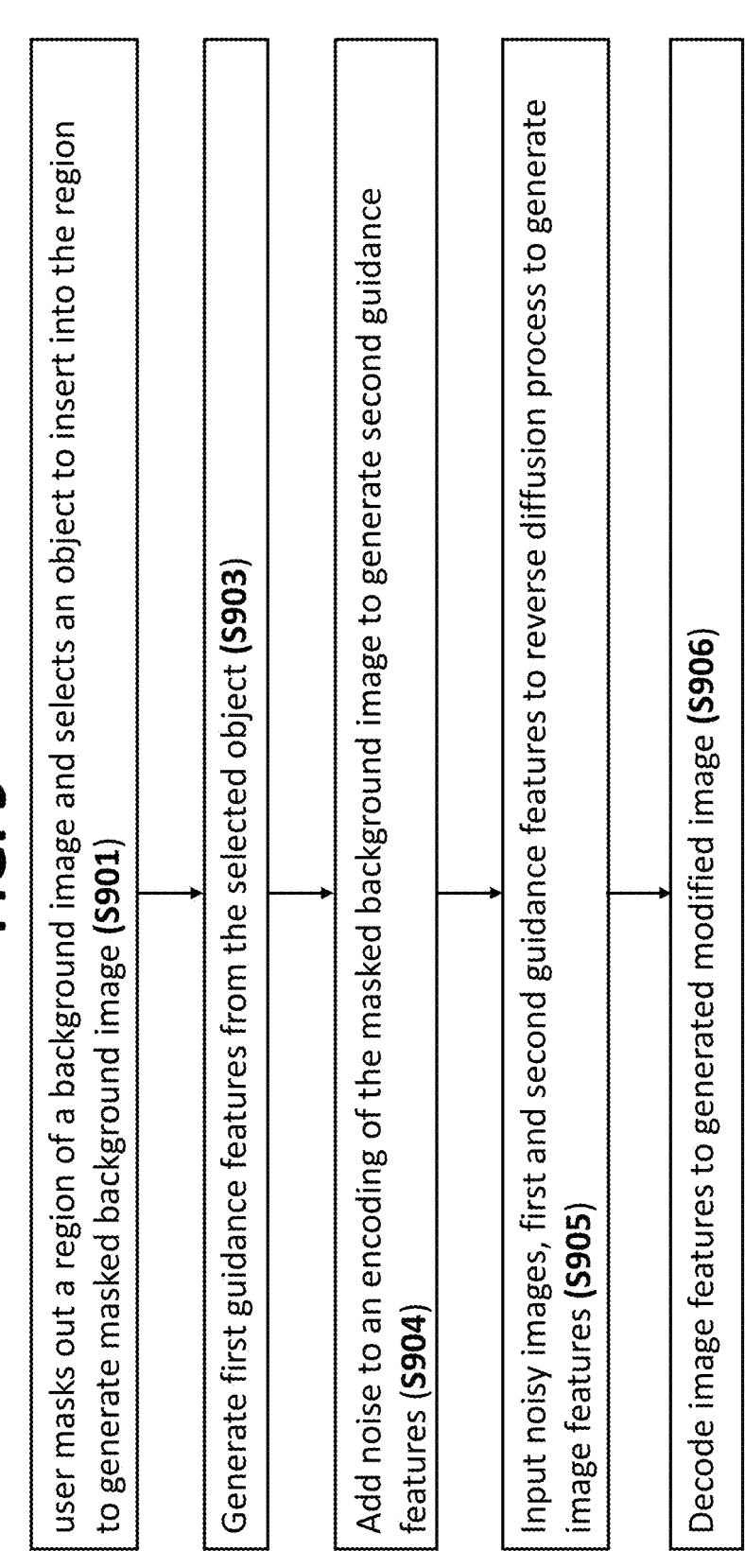
FIG. 9 illustrates a method of using the trained Diffusion model to insert an object into a background image according to an exemplary embodiment of the present disclosure.

FIG. 9 illustrates a method of using the trained diffusion model to insert an object into an image according to an exemplary embodiment.

The method of FIG. 9 includes a user masking out a region of a background image and selecting an object to insert into the region to generated a masked background image (S901). For example, the user may use the client user interface 112 to mark the region and to select the object image 122. In another example, the user uses the client user interface 112 for selecting a preliminary object image depicting the object and cropping the preliminary object image to generate the object image. For example, the user may crop out all pixels of the preliminary object image that do not include the object.

The method of FIG. 9 further includes generating first guidance features from the selected object (S903). For example, the encoder 285 may generate the first guidance features.

The method of FIG. 9 further includes adding to noise to an encoding of the masked background image 119 to generate second guidance features (S904). The noise added to the encoding may be one of a plurality of different noise maps, where each different noise map can contribute to generating a different final modified image. For example, the encoder 265 of FIG. 2 may encode the masked background image 119 and concatenate the noise to the encoded mask background image.

The method of FIG. 9 further includes inputting the noisy features, the first guidance features and the second guidance features to the reverse diffusion process 240 (e.g., a U-Net) to generate image features (S905). For example, the image features may correspond to the features 245 of FIG. 2. The noisy features may be denoised by the reverse diffusion process 240 to generate output features used to obtain the modified image 124. The noisy features may be combined with the first guidance features and/or the second guidance features using an attention block of the diffusion model 200.

The method of FIG. 9 further includes decoding the image features to generate the modified image (step 906). For example, the decoder 250 of FIG. 2 may perform the decoding to generate the modified image 124.

Figure 10:
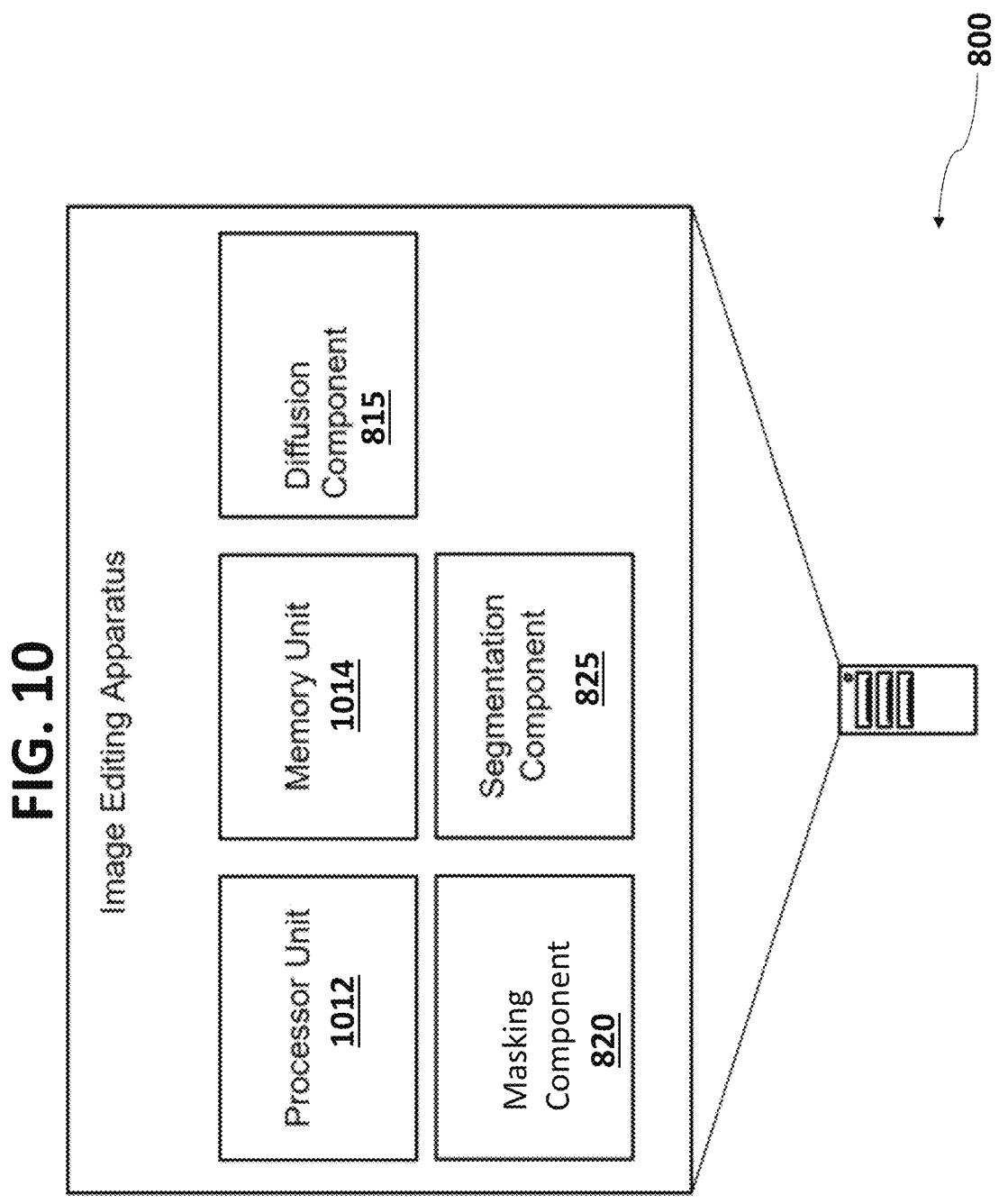
FIG. 10 illustrates an example of an image editing apparatus that may be used to insert an object into a background image according to an exemplary embodiment of the present disclosure.

FIG. 10 is an example of an image editing apparatus 800 according to aspects of the present disclosure. According to some aspects of the present disclosure, the image editing apparatus 800 enables a user to insert an object into a background image (e.g., 118) in an appropriate pose.

In one aspect, the image editing apparatus 800 includes a processor unit 1012 (e.g., includes one or more processors), a memory unit 1014 (e.g., a memory), a masking component 820, a diffusion component 815, and a segmentation component 825.

According to some aspects, the masking component 820 is used to generate a masked background image 119 from a background image 118, the segmentation component 825 is used to generate an object image 122 from a preliminary object image, and the diffusion component 815 generates a modified image 124 using the Diffusion model 200 based on the object image 122, and the masked background image 119. The image editing apparatus 800 may located entirely on the client device 110 or portions of the image editing apparatus 800 may be located on the client device 110 and the server 130.

Figure 11:
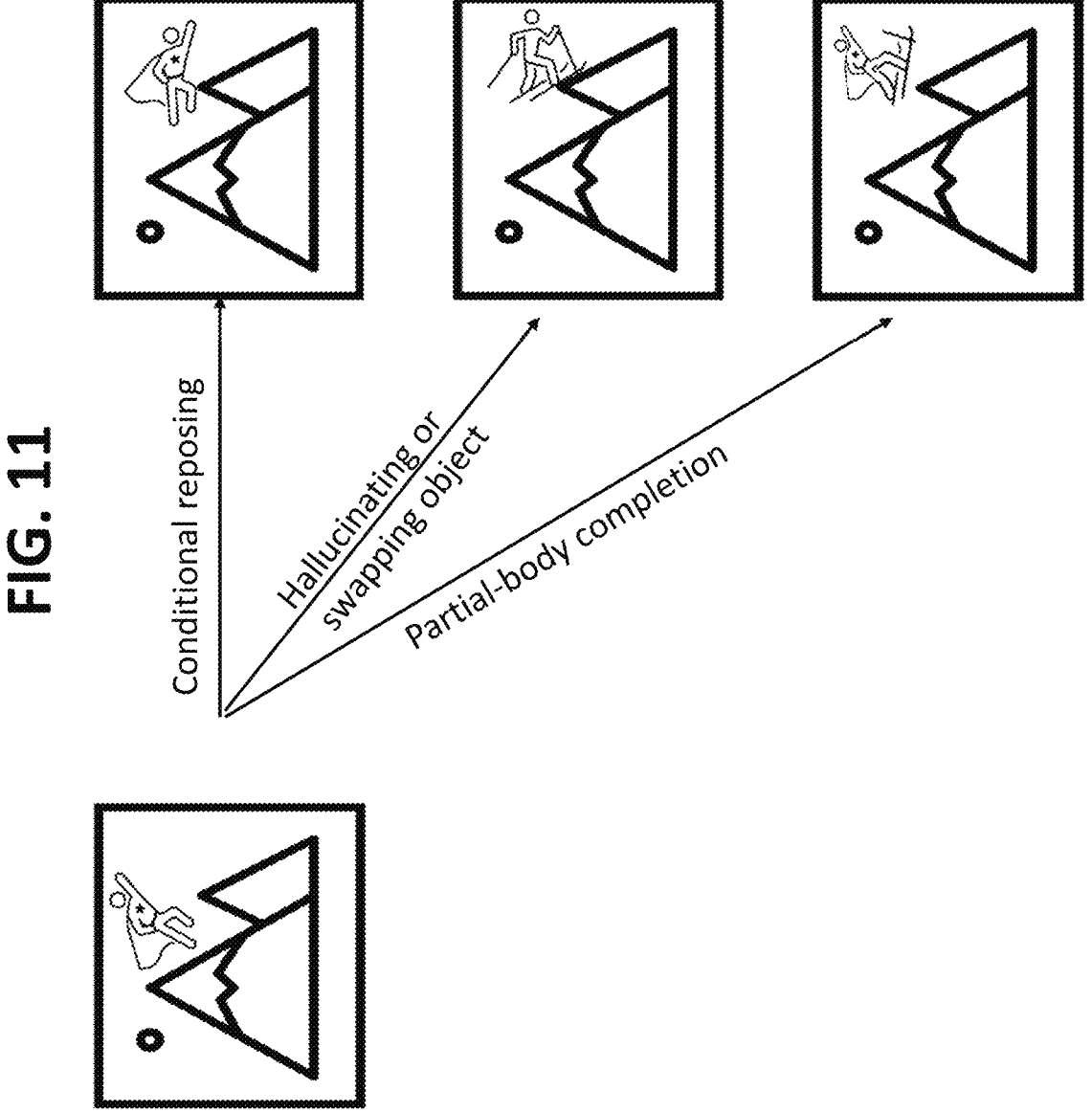
FIG. 11 illustrate functions that may be performed using a Diffusion model according to embodiments of the present disclosure.

As shown in FIG. 11, embodiments of the disclosure enable: i) conditional object reposing, ii) hallucinating of an object, iii) swapping of objects, and iv) partial-body completion.

In conditional object reposing, the pose of a same object in an image is changed to a different pose. The ground truth image includes the object (e.g., a person) in a first pose, and the object image includes the same object in a same or different pose. The object is entirely removed from a region of the ground truth image to generate a masked background image (e.g., 119). The Diffusion model 200 may learn features to insert into the region from features of the object image, features of the masked background image, and one of a plurality of different noise maps to generate the modified image 124 including the object in a second pose different from the first pose that appears natural based on the environment of the background. The second pose may vary based on the different noise maps.

In hallucinating of an object, a random object (e.g., a person) is inserted into an image in a pose that is appropriate to the environment of the image. The ground truth image may include an initial object or no object at all. Some pixels in a region of the ground truth image having a certain shape are removed to generate the masked background image (e.g., 119). The pixels may correspond to the initial object or to part of a background when the initial object is not present. The Diffusion model 200 may learn features to insert into the region from features of the masked background image, and one of a plurality of different noise maps to generate the modified image 124 including the random object in the pose.

In swapping of objects, a first object (e.g., a first person) in a first pose in an image is replaced with a second other object (e.g., a second other person) in a second other pose. The ground truth image includes the first object in the first pose, and the object image includes the second object in a second other pose. The first object is entirely removed from a region of the ground truth image to generate a masked background image. The Diffusion model 200 may learn features to insert into the region from features of the object image, features of the masked background image, and one of a plurality of different noise maps to generate a modified image including the second object in a third pose that may be different from the first and second poses that appears natural based on the environment of the background.

In partial-body completion, a part of an object (e.g., a person) in a first pose in an image is replaced with a corresponding part of the same object. The ground truth image includes the object in the first pose, and the object image includes the object in a second other pose. A part of the object is entirely removed from a region of the ground truth image to generate a masked background image. The Diffusion model 200 may learn features to insert into the region from features of the object image, features of the masked image, and one of a plurality of different noise maps to generate the modified image 124 including the remaining part of the object in a pose that appears natural based on the environment of the background.

At least one embodiment of the model provided above, can infer candidate poses given scene context and flexibly re-pose the same reference person into various different scenes. The model may harmonize the insertion by accounting for lighting and shadows.

Figure 12:
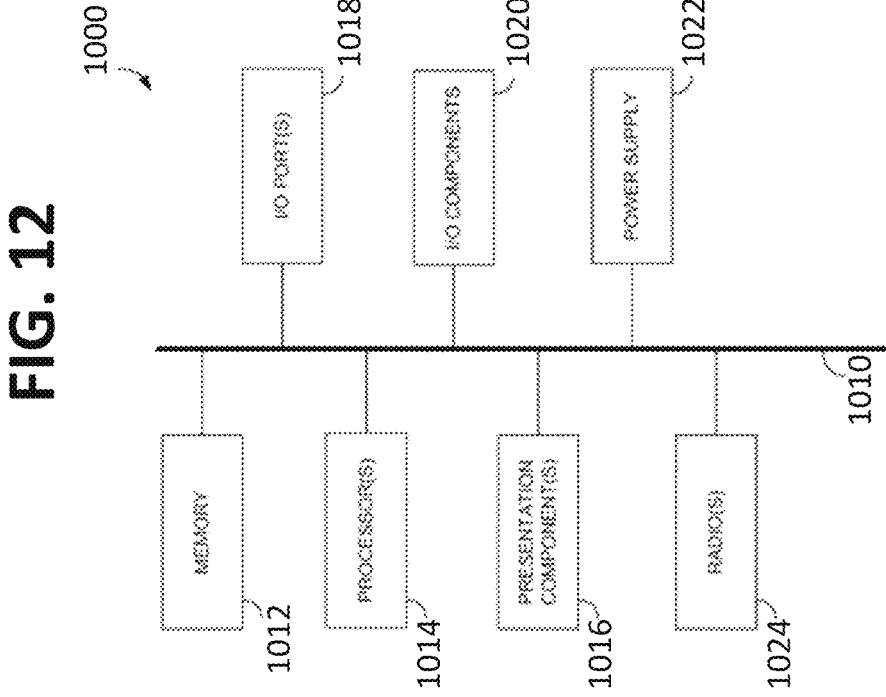
FIG. 12 illustrates an exemplary computing device used to perform one or more methods of the disclosure.

Having described implementations of the present disclosure, an exemplary operating environment in which embodiments of the present invention may be implemented is described below to provide a general context for various aspects of the present disclosure. Referring initially to FIG. 12 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). For example, one may consider a presentation component such as a display device to be an I/O component. The diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. For example, the training data and the diffusion model may be stored in the memory 1012 when the server 130 is implemented by computing device 1000. The computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A method comprising:
   obtaining a background image including a region for inserting an object;
   encoding the background image to obtain an encoded background;
   obtaining an object image depicting the object;
   encoding the object image to obtain an encoded object; and
   generating a modified image by denoising input noise based on the encoded background using a diffusion model, wherein the diffusion model takes the encoded object as an input and the modified image depicts the object within the region,
   wherein the object in the object image has a first pose, and the modified image includes the object with a second pose different from the first pose, and
   wherein the second pose is determined by the diffusion model based on the background image.

2. The method of claim 1, wherein the background image includes a part of the object, and the region of the modified image includes a part of the object image as a remaining part of the object.

3. The method of claim 1, further comprising:
   receiving a preliminary object image depicting the object;
   identifying the object in the preliminary object image; and
   cropping the preliminary object image to obtain the object image.

4. The method of claim 1, further comprising:
   combining the encoded background with a noise map to obtain input features;
   denoising the input features using the diffusion model to obtain output features; and
   decoding the output features to obtain the modified image.

5. The method of claim 4, further comprising:
   combining the input features with an encoded object determined from an object image of the object using an attention block of the diffusion model, wherein the output features are based at least in part on an output of the attention block.

6. The method of claim 1, further comprising:
receiving a mask input from a user, wherein the region for inserting the object is based on the mask input.

7. An apparatus comprising:
one or more processors; and
one or more memories including instructions executable by the one or more processors to:
  obtain an object image depicting an object and a background image including a region for inserting the object;
  encode, using an image encoder, the object image to obtain an encoded object;
  encode, using a condition encoder, the background image to obtain an encoded background; and
  generate, using a diffusion model, a modified image by denoising input noise based on the encoded object and the encoded background, wherein the modified image depicts the object within the region,
  wherein the object in the object image has a first pose, and the modified image includes the object with a second pose different from the first pose, and
  wherein the second pose is determined by the diffusion model based on the background image.

8. The apparatus of claim 7, wherein the instructions are further executable to:
  decode, using an image decoder, an output of the diffusion model to obtain the modified image.

9. The apparatus of claim 7, wherein:
the diffusion model comprises a U-Net architecture configured to incorporate the encoded object and the encoded background as input.

10. The apparatus of claim 7, wherein:
the diffusion model comprises a Denoising Diffusion Implicit Model (DDIM).

11. The apparatus of claim 7, wherein:
the diffusion model comprises an attention block configured to combined the encoded object and the encoded background.

12. The apparatus of claim 7, wherein:
the condition encoder comprises a multimodal text and image encoder for encoding the background image.

13. A non-transitory computer readable medium storing code for image processing, the code comprising instructions that, when executed by at least one processor, cause the at least one processor to perform operations comprising:
  obtaining a background image including a region for inserting an object;
  encoding the background image to obtain an encoded background;
  combining the encoded background with a noise map to obtain input features;
  generating a modified image by denoising input noise based on the encoded background using a diffusion model, wherein the modified image depicts the object within the region,
  wherein the modified image is generated by:
  denoising the input features using the diffusion model to obtain output features,
  decoding the output features to obtain the modified image, and
  combining the input features with an encoded object determined from an object image of the object using an attention block of the diffusion model, wherein the output features are based at least in part on an output of the attention block.

14. The non-transitory computer readable medium of claim 13, wherein:
the object in the object image has a first pose, and the modified image includes the object with a second pose different from the first pose.

15. The non-transitory computer readable medium of claim 14, wherein:
the second pose is determined by the diffusion model based on the background image.

* * * * *